340-870.14 SR CROSS REFERENCE SEARCH ROOM
XR 3,048,786

Aug. 7, 1962 N. BERINSON ETAL 3,048,786

SYNCHRONIZING SIGNAL GENERATOR FOR DEMULTIPLEXING SYSTEM

Filed Nov. 19, 1958 2 Sheets-Sheet 1

INVENTORS
NEIL BERINSON &
LEONARD FINKEL
BY Edward M. Ferrell
ATTORNEY

3048786
OR IN 328/110

Aug. 7, 1962 N. BERINSON ETAL 3,048,786

SYNCHRONIZING SIGNAL GENERATOR FOR DEMULTIPLEXING SYSTEM

Filed Nov. 19, 1958 2 Sheets-Sheet 2

INVENTORS
NEIL BERINSON &
LEONARD FINKEL
BY Edward M. Farrell
ATTORNEY

United States Patent Office 3,048,786
Patented Aug. 7, 1962

3,048,786

SYNCHRONIZING SIGNAL GENERATOR FOR DEMULTIPLEXING SYSTEM

Neil Berinson, Philadelphia, Pa., and Leonard Finkel, Haddonfield, N.J., assignors, by mesne assignments, to American Bosch Arma Corporation, Hempstead, N.Y., a corporation of New York Filed Nov. 19, 1958, Ser. No. 774,896
6 Claims. (Cl. 328—110)

This invention relates to multiplexing systems, and more particularly to systems involving generation of a synchronization pulse in a telemetering system.

In telemetering systems, it is desirable to transmit a maximum amount of information within a limited frequency band. In order to do this, a plurality of transducers are periodically sampled to produce a series of information pulses which are used to modulate a carrier of a transmitter to produce information signal trains. The information is transmitted to a receiving station where it may be recorded or applied to indicators. A master pulse or synchronizing signal, which may be in the form of a time interval or an actual pulse characteristically different from the information pulses, is transmitted along with the information pulses to provide synchronization between the transmitter and the receiver.

In many receiving telemetering systems, the information pulses at the receiving station are translated into a series of switching pulses which are used to sequentially switch or gate the input information signals to the proper recorder or indicator. In some cases, atmospheric noise or other factors may cause obliteration of one or more of the information pulses. In these cases, false switching pulses may be derived by appropriate circuitry at the receiving station to maintain proper sequencing thereby assuring that the proper information pulse is applied to the proper recorder or indicator.

In many telemetering systems, the master synchronizing pulse generated at the receiver may be characterized by the absence of two consecutive missing information pulses. Two consecutive missing information pulses cause two false switching pulses to be generated, which in turn, are used to produce the master pulse. Heretofore, if two consecutive information pulses were obliterated by atmospheric noise or other factors and were missing from the information train, two false switching pulses caused a master pulse to be generated to start the operation of a sequencing unit, for example. If the master pulse generated was in the middle of the information train period rather than at the start of an information train or between repeated information trains, information pulses were recorded on the wrong recorder or applied to the wrong indicator, thereby resulting in loss of information data.

It is an object of this invention to provide an improved demultiplexing system in which master pulses are generated only after the firing of the last information channel.

It is a further object of this invention to provide a demultiplexing system for generating a master pulse at the end of the firing of the last information channel in systems involving master pulses of relatively long or short durations.

It is still a further object of this invention to provide a system for generating a master synchronizing pulse after the last information channel has fired for systems involving the transmission of a synchronizing signal represented by an actual pulse or by a time interval.

In accordance with the present invention, a coincidence circuit is provided which is responsive to a condition normally denoting the start of an information train of pulse signals and a signal denoting the firing of the last information channel. When these two conditions are present, a master or synchronizing pulse is generated. In the absence of either of these two conditions, no master pulse is generated.

Other objects and advantages of the present invention will be apparent and suggest themselves to those skilled in the art from a reading of the following specification and claims in conjunction with the accompanying drawings in which:

Figure 1:
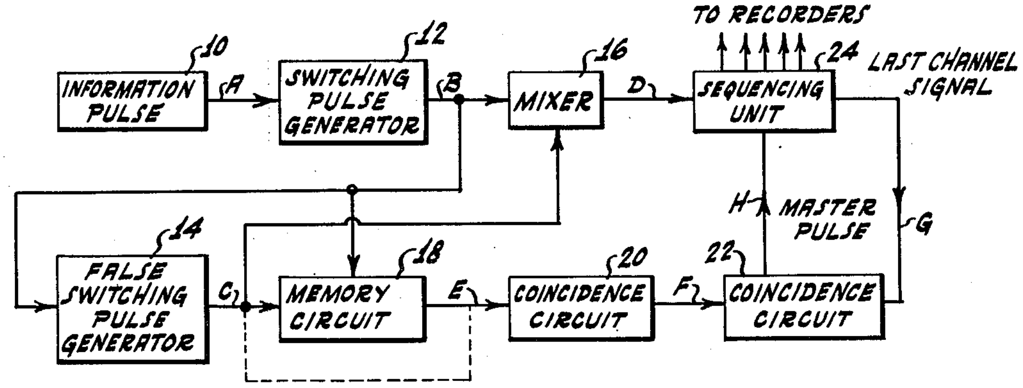
FIGURE 1 is a block diagram of a demultiplexing system, in accordance with the present invention.
Figure 2:
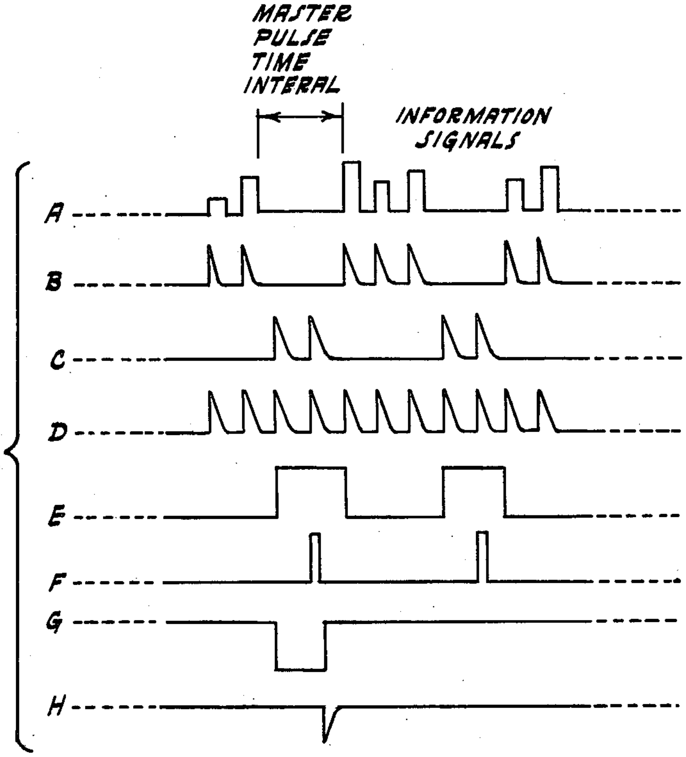
FIGURE 2 is a group of curves illustrating various operating conditions of the system shown in FIGURE 1; and, FIGURE 3 is a schematic diagram of a portion of the circuitry illustrated by block diagrams in FIGURE 1.

Referring particularly to FIGURES 1 and 2, a system which may be included in a receiving station of a telemetering system is illustrated. Information pulses from a source 10, illustrated at point A, are applied to a switching pulse generator 12, which derives a series of switching pulses from the information train. It is noted that a time interval or absence of signals for a predetermined duration, indicated as the master pulse time interval, is used to provide synchronization between the transmitter and receiver in the system. Switching pulses, illustrated at point B, are applied to a false switching pulse generator 14. No switching pulses are produced during the master pulse time interval or when information pulses are missing from the information train, as illustrated by the dotted pulses at point A. When switching pulses are not produced by the information pulses, false switching pulses such as illustrated at point C, are generated. False switching pulses are also produced during the master pulse time interval. The switching pulses from the pulse generator 12 and the false pulses from the pulse generator 14 are applied to a mixer 16 and combined to provide a series of switching pulses such as illustrated at point D. These are the pulses which are used to switch or gate information signals to recorders, for example, in the proper sequence.

An example of the circuitry involving the generation of switching pulses from information pulses and false switching pulses in the absence of information pulses is described in a patent issued to Reynolds et al. 2,592,737 issued on April 15, 1952, and assigned to the same assignee as the present invention.

Various circuits found in telemetering systems involving the information signals are not shown in detail since they form no part of the present invention.

The false switching pulses illustrated at point C and the switching pulses at point B are applied to a memory device 18. The memory device 18 is capable of storing information relating to the presence or absence of an information pulse, as determined by either the presence of a pulse from the switching pulse generator 12 at point B or a false switching pulse from the false switching pulse generator 14 at point C. The operating condition of the memory device 18 illustrated by the signal at point E, indicates whether the last pulse received by the memory device 18 was a switching pulse resulting from an information pulse or a false switching pulse resulting from the absence of an information pulse.

When two or more consecutive false switching pulses are received by the memory device 18, an output signal from a first coincidence circuit 20, illustrated at point F, is generated. One false switching pulse is normally not sufficient to cause an output signal from the coincidence circuit 20, except under special operating conditions involving short master pulse time intervals when it may be desirable to disable the memory circuit 18, as will be seen. A second coincidence circuit 22 is adapted to generate a master pulse, illustrated at point H, when a pulse from the first coincidence circuit 20 is generated at point F and a pulse from a sequencing unit 24 is generated at point G are simultaneously applied thereto. A pulse or change in operating condition is produced by the sequencing unit 24 at point G when the last information pulse in an information train has been applied to the sequencing unit 24, that is when the last pulse in the information wavetrain has caused the sequencing unit 24 to fire.

The switching pulses at point D are applied to the sequencing unit 24 with the output from the sequencing unit being applied to various recorders and indicators. In effect, these pulses from the sequencing unit provide gating signals to permit information pulses to be applied to the proper recorders. The sequencing unit 24 may be one of various types such as, for example, an electronic switching device commonly known as a "beam switching tube." Such a type of tube is well known to those skilled in the art and is therefore not described in detail. Upon the firing of the last information channel, the operating condition at point G changes from one operating state to another. This change in operating state may be the absence of cathode current in the beam switching tube after the last channel has fired, with cathode current normally present during the time of the information train. The change in operating condition caused by the firing of the last information channel is illustrated by the pulse at point G.

Figure 3:
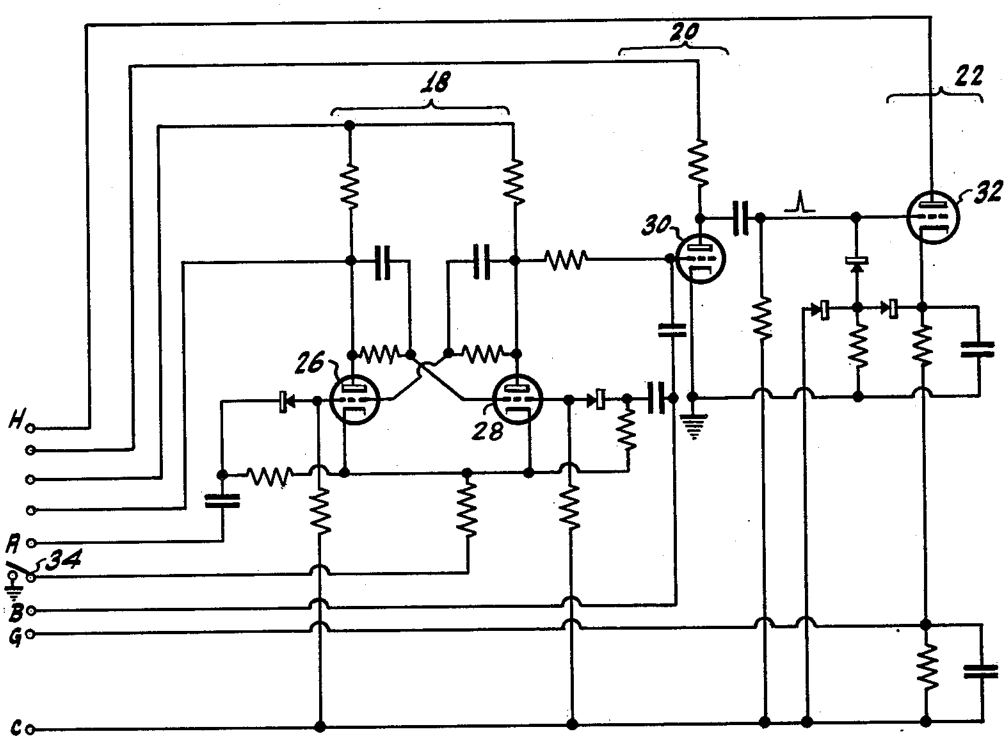

Referring particularly to FIGURE 3, the memory device 18 is illustrated as a flip-flop circuit comprising a pair of vacuum tubes 26 and 28. The flip-flop circuit is triggered to the "zero" state by the occurrence of a valid switching pulse at point B to the "one" state by the occurrence of a false switching pulse at point C. Since the two events are mutually exclusive, the flip-flop state or operating condition of the memory device indicates whether the last pulse received was a valid or false pulse. If a false pulse is received, the flip-flop is in the one operating condition. Reception of a first false switching pulse results in a relatively high anode voltage of the vacuum tube 28. This voltage is coupled to the control grid of a vacuum tube 30, which forms part of thec oincidence circuit 20. The vacuum tube 30 is normally cutoff. Operation of the flip-flop 18 by a false switching pulse in effect raises or steps the operating grid potential of the vacuum tube 30 but does not raise it to a point sufficient to cause conduction. A second consecutive false switching pulse applied to the vacuum tube 28 has no effect on its operation but since the second false switching pulse is also applied to the control grid of the vacuum tube 30, it is of sufficient amplitude to drive the tube 30 into conduction thereby causing a negative pulse to appear at the anode of the vacuum tube 30. The negative pulse at the anode of the vacuum tube 30 is differentiated to produce a positive pulse (see point F of FIGURES 1 and 2) which is applied to a second coincidence circuit 22 comprising a vacuum tube 32.

The vacuum tube 32 is normally cutoff. The positive pulse from the first coincidence circuit applied to the grid of the vacuum tube 32 is not of sufficient amplitude to drive the tube 32 into conduction. An additional signal is necessary to drive the tube 32 into conduction. Simultaneous application of a negative pulse at G to the cathode circuit of the vacuum tube 32 and the positive pulse from the vacuum tube 30 causes the vacuum tube 32 to conduct and results in a master pulse being generated at point H. Generation of a signal at point G without a pulse from point F will not produce a master pulse at point H. It is seen that when certain conditions of operation are present, such as noise or fading, the second coincidence circuit 22 assures reliable operation since it will produce an output signal only when the last information channel has completed its cycle.

In order to permit the system to operate with nonstandard input wave trains such as one having narrow master pulses, a switch may be connected to terminal 34 to disable the memory circuit 18 and to allow the master pulse to be generated coincident with the first false switching pulse occurring after the completion of the last information pulse in a train. This may be accomplished in effect by "stepping-up" the voltage at the control grid of the vacuum tube 30 to the level corresponding to the level of the anode voltage at the control grid 28 when a false switching pulse was received. This mode of operation with narrow master pulses will permit the system to synchronize PAM wavetrains having a master pulse interval corresponding in duration to two "on" time and one "off" time, rather than the standard three "on" time and two "off" time. Similarly, the PDM operation, the narrow master pulse mode of operation will permit the system to synchronize with an input wavetrain having only a single missing pulse for the synchronization interval, rather than the standard two consecutive missing pulses.

In considering the various waveforms illustrated in FIGURE 2, only the portions of the waveforms affecting the operation of the system as related to the generation of master pulses are shown. For example, the waveforms are illustrated as being well defined and of one polarity, whereas in actual practice such waveforms may be irregular in shape and be accompanied by noise spikes, pulses of opposite polarity resulting from differentiation, etc.

What is claimed is:

1. In a multiplexing system including means for deriving interchannel switching pulses from information pulses in an information pulse signal train and from a false switch pulse generator in the absence of said information pulses with said signal train including a master pulse time interval, the combination comprising a sequencing unit for generating a signal when the last pulse in said information pulse signal train has been received, means for generating a signal during said master pulse interval, a coincidence circuit for generating synchronization signals when a signal from said sequencing unit and a signal generated during said master pulse interval are applied thereto.

2. In a multiplexing telemetering receiving station including means for deriving interchannel switching pulses from information pulses in an information pulse signal train and from a false switch pulse generator in the absence of said information pulses with said signal train including a master pulse time interval, means for generating synchronization signals at said receiving station comprising a sequencing unit for generating a signal when the last pulse in said information pulse signal train has been received, a circuit for generating a signal during said master pulse interval, a coincidence circuit for generating said synchronization signals when signals from said sequencing unit denoting the reception of a last information pulse in said information train and said circuit are simultaneously applied thereto, and means for applying the output signals from said sequencing unit and said circuit to said coincidence circuit.

3. In a multiplexing telemetering receiving station including means for deriving interchannel switching pulses from information pulses in an information pulse signal train and from a false switch pulse generator in the absence of said information pulses with said signal train including a master pulse time interval, means for generating synchronization signals at said receiving station comprising a sequencing unit for generating a signal when the last pulse in said information pulse signal train has been received, means including a multivibrator circuit for generating a signal during said master pulse interval, a coincidence circuit for generating said synchronization signals when signals from said sequencing unit denoting the reception of a last information pulse in said information train and said multivibrator circuit are simultaneously applied thereto, means for applying the output signals from said sequencing unit and said multivibrator circuit to said coincidence circuit, and means for applying said synchronizing signals to said sequencing unit.

4. In a telemetering multiplexing system for receiving a series of information pulse signals including a master pulse time interval, a switching pulse generator for deriving pulses from said information pulse signals, a false switching pulse generator for deriving pulses in the absence of said information pulse signals and during said master pulse time interval, means for combining the pulses from said switching and false switching pulse generators to provide a series of interchannel switching pulses, a sequencing unit, means for applying said interchannel switching pulses to said sequencing unit, a synchronizing pulse generator for generating a synchronizing pulse to control the operation of said sequencing unit, said synchronizing pulse generator including a coincidence circuit, means including a multivibrator circuit for generating a pulse signal during said master pulse interval, means for applying said pulse signal from said multivibrator circuit and a pulse representative of the last pulse in said series of information pulses to said coincidence circuit to generate a synchronizing pulse during said master pulse time interval at the end of said series of information pulses, and means for applying said synchronizing pulse to said sequencing unit.

5. In a telemetering multiplexing system for receiving a series of information pulse signals including a master pulse time interval, a switching pulse generator for deriving pulses from said information pulse signals, a false switching pulse generator for deriving pulses in the absence of said information pulse signals and during said master pulse time interval, a sequencing unit, a synchronizing pulse generator for generating a synchronizing pulse to control the operation of said sequenching unit, said synchronizing pulse generator including a first coincidence circuit, a multivibrator circuit, means for applying said pulses from said switching and false switching pulse generators to said multivibrator circuit to change the operating state of said multivibrator circuit from one stable state to another stable state dependent upon the character of the last pulse received, a second coincidence circuit associated with said multivibrator circuit, means for generating a signal in the output circuit of said second coincidence circuit when more than one consecutive false switching pulses are applied to said multivibrator circuit, means for applying said signal from said second coincidence circuit and a pulse representative of the last pulse in said series of information pulses to said first coincidence circuit of said synchronizing pulse generator to generate a synchronizing pulse during said master pulse time interval at the end of said series of information pulses, and means for applying said synchronizing pulses to said sequencing unit.

6. In a telemetering multiplexing system for receiving a series of information pulse signals including a master pulse time interval, a switching pulse generator for deriving pulses from said information pulse signals, a false switching pulse generator for deriving pulses in the absence of said information pulse signals and during said master pulse time interval, a mixer for combining the pulses from said switching and false switching pulse generators to provide a series of interchannel switching pulses, a sequencing unit, means for applying said interchannel switching pulses to said sequencing unit, a synchronizing pulse generator for generating a synchronizing pulse to control the operation of said sequencing unit, said synchronizing pulse generator including a first coincidence circuit, a multivibrator circuit, means for applying said pulses from said switching and false switching pulse generators to said multivibrator circuit to change the operating state of said multivibrator circuit from one stable state to another stable state dependent upon the character of the last pulse received, a second coincidence circuit associated with said multivibrator circuit, means for generating a signal in the output circuit of said second coincidence circuit when more than one consecutive false switching pulses are applied to said multivibrator circuit, means for applying said signal from said second coincidence circuit and a pulse representative of the last pulse in said series of information pulses to said first coincidence circuit of said synchronizing pulse generator to generate a synchronizing pulse during said master pulse time interval at the end of said series of information pulses, and means for applying said synchronizing pulses to said sequencing unit.

References Cited in the file of this patent

UNITED STATES PATENTS

| | | |
|---|---|---|
| 2,499,534 | Sorber | Mar. 7, 1950 |
| 2,537,056 | Hoeppner | Jan. 9, 1951 |
| 2,592,737 | Reynolds | Apr. 15, 1952 |
| 2,739,301 | Greenfield | Mar. 20, 1956 |